United States Patent
Miller et al.

[11] Patent Number: 6,039,911
[45] Date of Patent: Mar. 21, 2000

[54] METHOD FOR CAPPING STEM FASTENERS

[75] Inventors: Philip Miller; Thomas R. LaLiberte, both of Eagan, Minn.

[73] Assignee: 3M Innovative Properties Company, St. Paul, Minn.

[21] Appl. No.: 08/781,783

[22] Filed: Jan. 9, 1997

[51] Int. Cl.[7] .................................................. B29C 43/22
[52] U.S. Cl. ...................... 264/280; 264/167; 264/296; 264/555; 425/387.1; 425/403.1
[58] Field of Search .................................. 264/280, 284, 264/322, 296, 167, DIG. 66, 555; 425/387.1, 403.1, DIG. 34; 24/452

[56] References Cited

U.S. PATENT DOCUMENTS

| | | | |
|---|---|---|---|
| 2,820,277 | 1/1958 | Forster . | |
| 3,408,705 | 11/1968 | Kayser et al. | 24/204 |
| 3,557,407 | 1/1971 | Lemelson | 18/10 |
| 3,594,865 | 7/1971 | Erb | 18/5 |
| 3,629,032 | 12/1971 | Erb | 156/196 |
| 3,718,725 | 2/1973 | Hamano | 264/163 |
| 3,762,000 | 10/1973 | Menzin et al. | 24/204 |
| 4,056,593 | 11/1977 | de Navas Albareda | 264/145 |
| 4,274,182 | 6/1981 | Greenway | 26/2 R |
| 4,290,174 | 9/1981 | Kalleberg | 24/204 |
| 4,322,875 | 4/1982 | Brown et al. | 24/204 |
| 4,454,183 | 6/1984 | Wollman | 428/92 |
| 4,462,784 | 7/1984 | Russell | 425/223 |
| 4,582,740 | 4/1986 | Zürcher et al. | 428/88 |
| 4,643,130 | 2/1987 | Sheath et al. | 118/681 |
| 5,040,275 | 8/1991 | Eckhardt et al. | 24/447 |
| 5,058,247 | 10/1991 | Thomas et al. | 24/448 |
| 5,077,870 | 1/1992 | Melbye et al. | 24/452 |
| 5,100,400 | 3/1992 | Mody et al. | 604/391 |
| 5,256,231 | 10/1993 | Gorman et al. | 156/178 |
| 5,512,234 | 4/1996 | Takizawa et al. | 264/511 |
| 5,607,635 | 3/1997 | Melbye et al. | 264/169 |
| 5,679,302 | 10/1997 | Miller et al. | 264/167 |
| 5,755,015 | 5/1998 | Akeno et al. | 24/452 |

FOREIGN PATENT DOCUMENTS

| | | |
|---|---|---|
| 0 330 811 A2 | 9/1989 | European Pat. Off. . |
| 0 341 993 A1 | 11/1989 | European Pat. Off. . |
| 0 578 036 A1 | 1/1994 | European Pat. Off. . |
| 0 811 332 A2 | 12/1997 | European Pat. Off. . |
| 1-108021 | 4/1989 | Japan . |
| 7-056354 | 3/1995 | Japan . |
| WO 82/02480 | 8/1982 | WIPO . |
| WO 92/04839 | 4/1992 | WIPO . |
| WO 94/23610 | 10/1994 | WIPO . |

*Primary Examiner*—Jan H. Silbaugh
*Assistant Examiner*—Mark Eashoo
*Attorney, Agent, or Firm*—Gary L. Griswold; Robert W. Sprague; William J. Bond

[57] ABSTRACT

A method and apparatus for capping a headed stem fasteners. The precursor web having a backing with a rear surface, a front surface, and a multiplicity of polymeric stems projecting distally from the front surface of the backing is fed into a variable nip between a heated member opposite a support surface. The support surface has a shape generally conforming to the contour of the heated member. The variable nip compressively engages the polymeric stems between the heated member and the support surface so that distal ends of the polymeric stems are deformed. The heated member can be a heated roll or a heated belt. The support surface may be a curved capping shoe or a belt shaped to create a particular nip profile.

28 Claims, 5 Drawing Sheets

METHOD FOR CAPPING STEM FASTENERS

FIELD OF THE INVENTION

The present invention is directed to a method and apparatus for capping headed stem fasteners, and more particularly, to a method and apparatusfor controlling the nip profile and for increasing the nip length.

BACKGROUND OF THE INVENTION

Various fasteners that releasably interengage with other articles are widely used as low cost garment fasteners, such as on disposable diapers. One type of headed stem fastener is the hook portion of a hook-and-loop fastener. Although the hook portion of a hook-and-loop fastener is typically designed to engage with a loop strip, the hook portion can be used by itself to become releasably fastened to fabrics that are easily penetrated by the hook. Another type of headed stem fastener that is particularly suited for this purpose is a mushroom-headed fastener, such as available under the product designation XMH-4152 from Minnesota Mining & Manufacturing Company of St. Paul, Minn. Mushroom-headed fasteners can be designed to become releasably fastened to burlap, Terri cloth, and tricot.

Stem fasteners are typically formed by capping polymeric stems extending distally from a backing layer. The precursor web containing the stems can be prepared according to a variety of techniques, such as disclosed in U.S. Pat. No. 4,290,174 (Kalleberg) and U.S. Pat. No. 5,679,302 (Miller), entitled Mushroom-Type Hook Strip for a Mechanical Fastener (WO 94/23610).

FIGS. 1 and 3 are schematic illustrations of two commonly used methods for capping stems projecting upward from a precursor web. In the embodiment of FIG. 1, a precursor web 20 is fed through a gap in a nip 21 between two calender rolls 22 and 24. The heated calender roll 22 contacts a predetermined portion of a distal end 26 of the stems 28 projecting upward from a backing 30. The temperature of the heated calender roll 22 is maintained at a temperature that will readily deform the distal ends 26 under mechanical pressure in the nip 21.

Maintaining the distal ends 26 at this temperature allows melting and molecular disorientation of the stems 28. During such contact and/or upon subsequent cooling, a head 32 is formed on the distal ends 26. The heads 32 can be a variety of shapes, such as mushroom-shaped heads, "umbrella," "nail head," "golf tee" and "J-shaped." Mushroom shaped heads typically have a flat, planar or slightly convex upper surface and a maximum cross-section larger than the diameter of the stem immediately below the head (see FIGS. 8A and 8B).

The capping mechanism is generally a time-temperature-pressure phenomenon, although it is possible that some heat may be transmitted to the stems by convection. In practice, the height of the stems 28 and the finished height of the capped stem 32 are determined by the product design. The upper temperature at the roll 22 is generally limited to the temperature at which the polymer of the stems 28 sticks to the roll.

FIG. 2 is a diagram illustrating the size of the capping surface 34 (see FIG. 1) of a conventional calendering system. In FIG. 2, R is the radius of the heated roll, X is the distance over which the precursor web 20 is capped, $t_2$ is the height of the capped stem 32, and $t_1$ is the height of the stem 28. For a typical product, $t_2$ is approximately 0.51 mm and $t_1$ is approximately 0.74 mm. Using the following equation, the capping surface or distance 34 for a calender roll with a diameter of 45.7 cm (18 inches) is approximately 7.2 mm.

$$x = \frac{2\pi R}{360}\left[\cos^{-1}\left[\frac{d-t_1}{2R}\right]\right]$$

FIG. 3 is a schematic illustration of an alternate method and apparatus for forming headed stems 42. The precursor web 20 is positioned so that a heated platen 40 is located above the stems 28. The heated platen 40 heats the air near the distal ends 26 of the stems 28 to cause the ends to soften by convection. The stems are deformed into generally hemispherical-shaped heads 42. In order to achieve controlled deformation of the distal ends 26, the temperature at which the heated platen 40 can be operated is limited by the polymer from which the stems 28 are constructed. Additionally, the ability to control the shapes of the heads 42 is limited.

BRIEF SUMMARY OF THE INVENTION

The present invention is directed to a method and apparatus for capping headed stem fasteners. The present method and apparatus controls the nip profile and increases the nip length.

The present method of capping a headed stem fastener includes providing a precursor web having a backing with a rear surface, a front surface, and a multiplicity of polymeric stems projecting distally from the front surface of the backing. A heated member is positioned opposite a support surface to form a variable nip having a variable nip length. The support surface has a shape generally conforming to a contour of the heated member. The precursor web is fed along the length of the variable nip to compressively engage the polymeric stems between the heated member and the support surface so that distal ends of the polymeric stems are deformed.

A variety of nip profiles may be configured using the present heated member and support surface. The nip gap may decrease along the variable nip length. The nip gap may have a generally constant rate of decreases along the variable nip length. The nip gap may decrease more rapidly near a nip inlet than near a nip outlet or the nip gap may decrease more rapidly near a nip outlet than near a nip inlet. The nip gap may have a generally constant rate of decrease near a nip inlet and a nonuniform rate of increase near a nip outlet. The nip gap may remain constant along a portion of the variable nip length and vary elsewhere along the variable nip length.

The curved support structure forms a variable nip having a variable nip length that is significantly longer than can be achieved using a pair of rolls of a comparable diameter. Therefore, without changing the diameter of the heated roll, the present curved support structure permits the variable nip length to be increased. Since capping is generally a time-temperature-pressure phenomenon, for a given time, temperature and pressure, the line speed of the precursor web through the present variable nip is greater using the present curved support structure than using a conventional two roll nip. The combination of the present heated roll and curved support structure define a variable nip length preferably at least 1.25 times greater than the nip length defined by a pair of rolls having the same diameter as the heated roll, and more preferably at least 1.5 times greater, and most preferably at least 3.0 times greater.

The present invention is also directed to an apparatus for capping a precursor web. The precursor web has a multiplicity of polymeric stems projecting distally from a front surface of a backing. The apparatus includes a heated member opposite a support surface forming a variable nip having a variable nip length. The support surface has a shape generally conforming to a contour of the heated member. A feeding mechanism feeds the precursor film through the variable nip along the variable nip length to compressively engage the polymeric stems between the heated member and the support surface supports so that distal ends of the polymeric stems are deformed.

The heated member may be a heated roll opposite a curved support surface. The curved support surface preferably has a radius of curvature generally conforming to a radius of curvature of the heated roll. The support surface may be slid or rotated into engagement with the heat roll.

In an alternate embodiment, the heated member may be a heated belt opposite the support surface. The support surface may be a support belt. The shape of the heated belt may optionally be altered by a support roll or a curvilinear slide plate. The heated belt and the support surface define at least two tapered zones. Alternatively, the heated belt has a generally planar configuration.

The present invention includes moving the heated member at a rate greater than, less than or equal to a line speed of the precursor web through the variable nip. A low friction interface may be generated between the rear surface of the backing and the support surface. The low friction interface may be for example a fluid bearing or a low energy material on the support surface.

The distal ends of the polymeric stems may be deformed into a variety of shapes, such as mushroom-shaped heads, J-hooks and umbrella-shaped heads. The polymeric stems preferably project at a generally right angle from the front surface of the backing. The backing may be a polymeric film.

As used herein;

Variable nip refers to a nip formed by two or more members, one of which does not have a circular cross-section.

Variable nip length refers to the effective length of the variable nip in the machine direction.

DETAILED DESCRIPTION OF THE INVENTION

Figure 4:
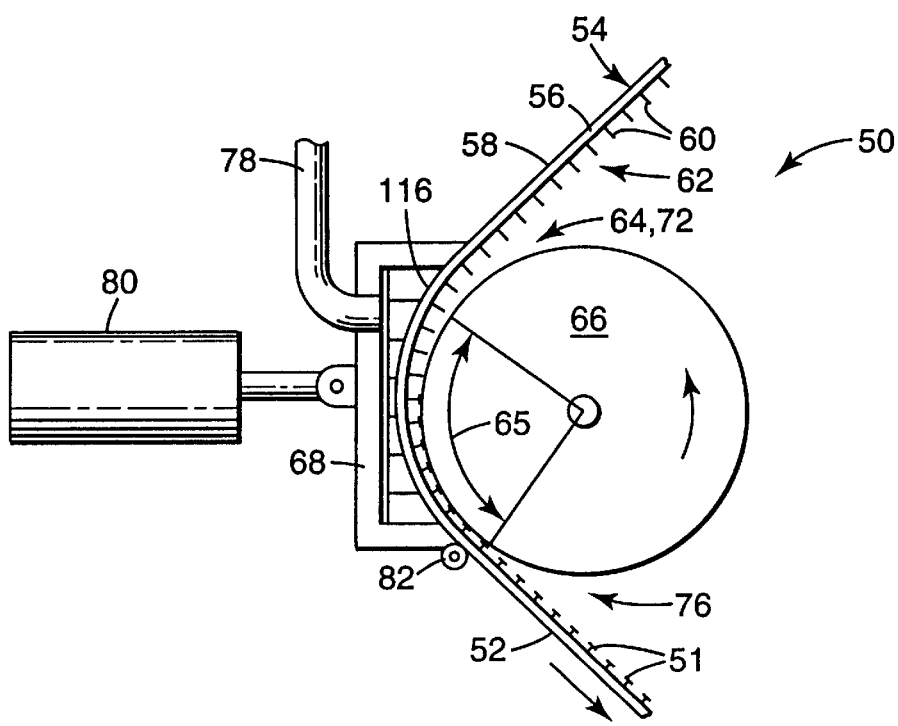
FIG. 4 is a schematic illustration of the present method and apparatus for forming headed stem fasteners.

FIG. 4 is a schematic illustration of a capping apparatus 50 for forming a headed stem fastener 52 having a plurality of generally uniform heads 51. A precursor web 54 having a backing 56 with a rear surface 58 and a multiplicity of polymeric stems 60 projecting distally from a front surface 62 is directed into a variable nip 64. The variable nip 64 is formed between a heated roll 66 and a curved support structure 68. The curved support structure 68 preferably has a shape generally conforming to the contour or radius of curvature of the heated roll 66 so that the stems may be brought into a compressive engagement with the heated roll 66. Piston 80 provides a compressive force between the curved support structure 68 and the heated roll 66. Depending upon the relative position and radii of the heated roll 66 and the support structure 68, the rate of increase or decrease of the nip gap can be varied along a variable nip length 65.

In the present invention, the preferred nip profile has an average slope angle of 0.138 and the total nip length 65 of 11.43 cm (4.5 inches). By changing the average slope, the total effective nip length can be increased or decreased. For example, FIG. 4 illustrates a tapered nip inlet 72 where little or no capping activity takes place. Therefore, some fraction of the total curved support structure 68 is actually utilized for capping. In the preferred embodiment, that fraction is about 76%, for a total active nip length of 8.7 cm. Moreover, the variable nip length 65 may be easily increased for specific application by increasing the length of the curved support structure 68.

The heated roll 66 has a diameter of 20.32 cm (8.0 inches). In order to obtain a nip length of 11.43 cm using a two roll nip system, such as rolls 22, 24 of FIG. 1, the roll diameters would need to be about 115.4 meters (375 feet) in diameter. The combination of the present heated roll 66 and curved support structure 68 define a variable nip length 65 preferably at least 1.25 times greater than the nip length defined by a pair of rolls having the same diameter as the heated roll, and more preferably at least 1.5 times greater, and most preferably at least 3.0 times greater.

Figure 1:
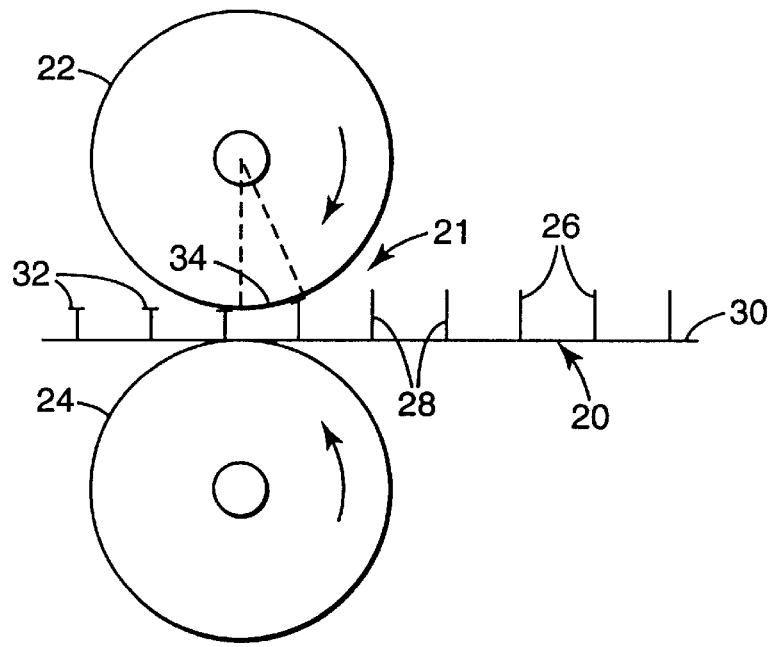
FIG. 1 is a prior art calendering system for forming headed stem fasteners.
Figure 2:
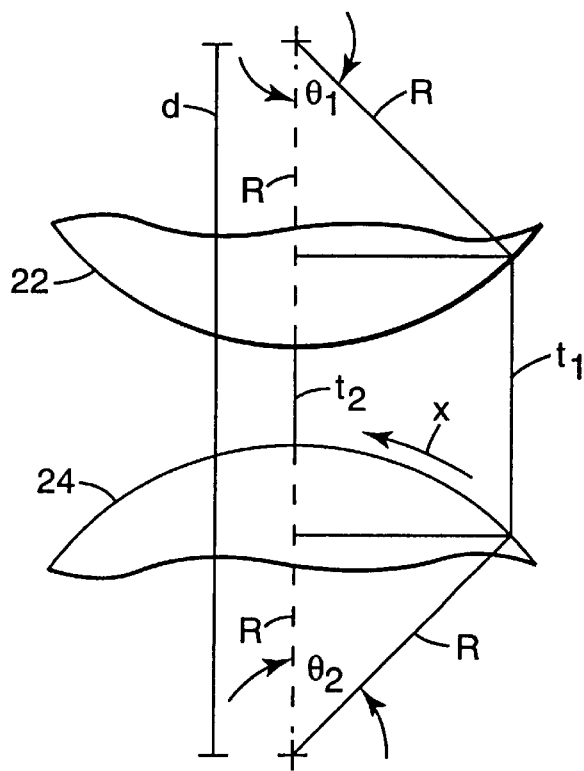
FIG. 2 is a schematic illustration for determining the capping surface of the calendering system such as disclosed in FIG. 1.
Figure 3:
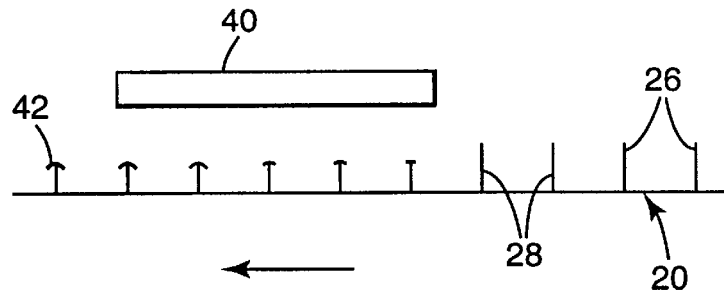
FIG. 3 is a schematic illustration of an alternate prior art capping system for forming headed stem fasteners.

The curved support structure 68 forms a variable nip having a variable nip length 65 that is significantly longer than can be achieved using a pair of rolls of a comparable diameter, such as illustrated in FIG. 1. Therefore, without increasing the diameter of the heated roll 66, the present curved support structure 68 permits the variable nip length 65 to be increased. Since capping is generally a time-temperature-pressure phenomenon, for a given time, temperature and pressure, the line speed of the precursor web 54 through the variable nip 64 is greater using the present curved support structure 68 than using a conventional two roll nip.

Figure 9:
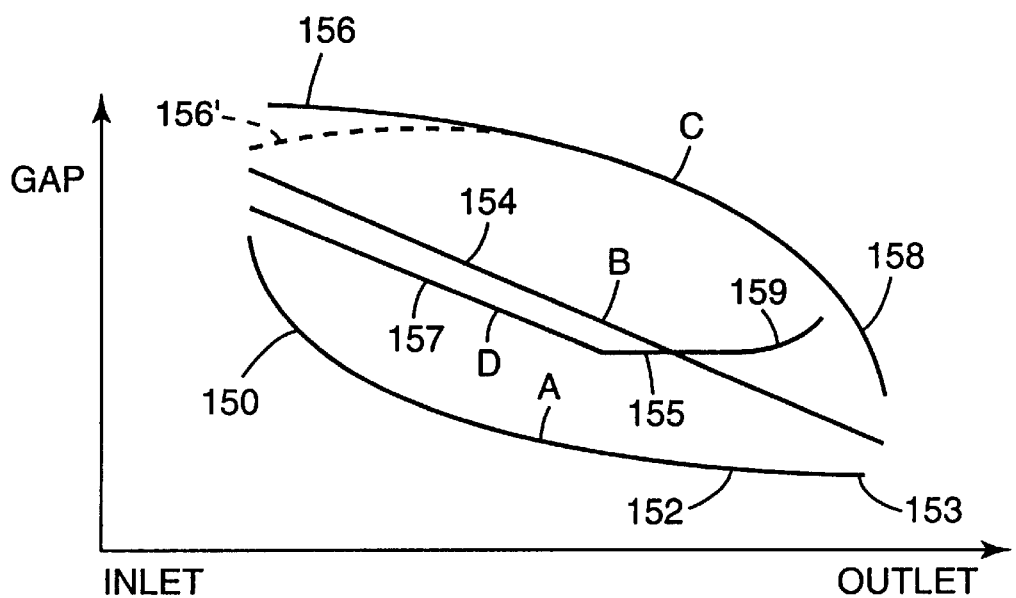
FIG. 9 is a graphic illustration of exemplary gap profiles along the variable nip length.

FIG. 9 is a graphic illustration of exemplary nip profiles. The curve A generally corresponds to the nip profile of a two roll calendar, such as the rolls 22, 24 illustrated in FIG. 1. The curve A shows a rapid decrease of the nip gap along the portion 150 near the nip inlet. The nip gap decreases more slowly along the portion 152 near the nip outlet 153.

Consequently, the rate of change of the nip gap along the variable nip length (slope of a tangent to the curve A) generally decreases along the variable nip length. The nip outlet 153 corresponds to the minimum nip between the two rolls. By increasing the diameter of the rolls, the curve A will tend to flatten, although the greater decrease of the nip gap near the nip inlet than at the nip outlet will be maintained. The curve B shows a rate of change of the nip gap (slope of the curve B) that is generally uniform along the variable nip length 154.

The curve C shows a nip profile with a nip gap decreasing slowly along the portion 156 and then decreasing rapidly along the portion 158 near the nip outlet. The rate of change of the nip gap (slope of a tangent to the curve C) generally increases along the variable nip length. In an alternate embodiment, the curve C can have an upwardly sloping portion 156' near the nip inlet. This concave-downward configuration corresponds generally to a curved support structure with a radius of curvature less than the radius of curvature of the heated roll. This alternate nip profile for curve C provides a two-step capping process, with some initial capping activity near the nip inlet along portion 156', a relief zone along the center portion and final capping activity along the portion 158 near the nip outlet.

The curve D shows a nip profile with a generally constant rate of decrease in nip gap starting at the nip inlet and along a portion 157. The nip gap remains constant along the portion 155. The nip gap actually increases along the portion 159 near the nip outlet to facilitate release of the web from the variable nip.

The rate of decrease of the nip gap defines a compression front of the stems 60. The variable nip length and temperature of the heated roll 66 define a melt front of the stems 60. The adjustability of the nip profile along the variable nip length using the present support structure permits the melt front of the stems 60 to be optimized or balanced with the compression front on the stems 60.

The variable nip 64 defines a first gap at a nip inlet 72 and a second gap at a nip outlet 76. The second gap is preferably less than the first gap. In the preferred embodiment, the variable nip 64 decreases generally continuously between the nip inlet 72 and nip outlet 76. In an alternate embodiment, the variable nip 64 may decrease to a minimum value at some intermediate location between the nip inlet and outlet 72, 76 (see FIG. 5A) and thereafter maintain a constant nip gap or an increasing nip gap.

A fluid, such as air or water, may be introduced through pipe 78 to the interface between the rear surface 58 of the backing 56 and the surface 116 to create a fluid bearing. The surface 116 may optionally be coated with a low surface energy material such as polytetrafluoroethylene (PTFE) or ultra high molecular weight polyethylene. Without the air bearing, the backing 56 tends to wrinkle as it enters the variable nip 64, potentially causing tears in the backing 56. A piston 80 is provided for positioning the curved support structure 68 relative to the heated roll 66. The curved support structure 68 may also pivot along a pivot point 82 to further adjust the variable nip 64.

The relative line speed of the heated roll 66 and the precursor web 54 determines the shape of the heads 51 on the headed stem fastener 52. The rate of rotation of the heated roll 66 may be greater than, less than or equal to the line speed of the precursor web 54. For some applications, the roll 66 may be stationary while the precursor web 54 moves thought the variable nip 64. Alternatively, the roll 66 may be rotated in a direction opposite to the movement of the precursor web 54.

Figure 5:
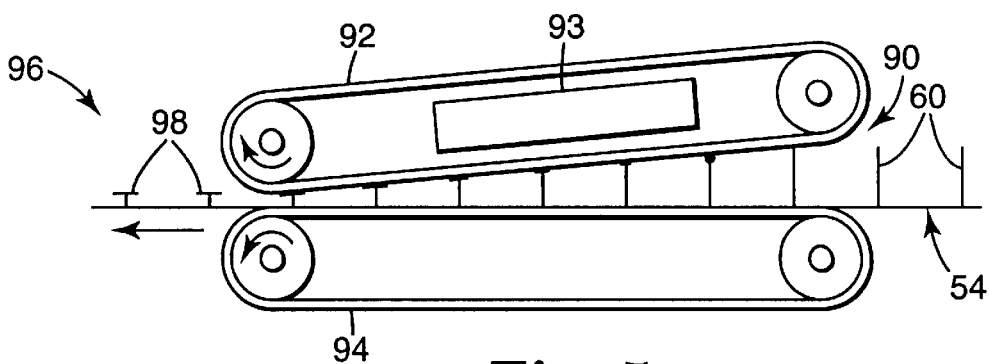
FIG. 5 is a schematic illustration of an alternate method and apparatus of the present invention for forming headed stem fasteners.

FIG. 5 is an alternate embodiment of the present method and apparatus for forming headed stem fasteners 96. Opposing belts 92, 94 have elongated portions defining a variable nip 90. Heat source 93 maintains belt 92 at the desired temperature. The heated belt 92 is angled with respect to the belt 94 to form a continuously decreasing variable nip 90. The precursor web 54 is fed into the variable nip 90, where the stems 60 are compressively engaged between the opposing belts 92, 94. The heat and mechanical force deforms the stems 60 to form a headed stem fastener 96 with a plurality of heads 98.

Movement of the belts 92, 94 is preferably synchronized so that the relative line speed of the belts 92, 94 is generally equal. Synchronous movement of the belts 92, 94 is preferred to form symmetrical heads 98. Alternatively, the relative movement of the belts 92, 94 can be slightly asynchronous to achieve asymmetrical heads 98, such as J-shaped hooks. It will be understood that a stationary support structure can be substituted for the belt 94, in which event the support structure preferably includes a low friction surface, such as the air bearing discussed above.

Figure 5A:
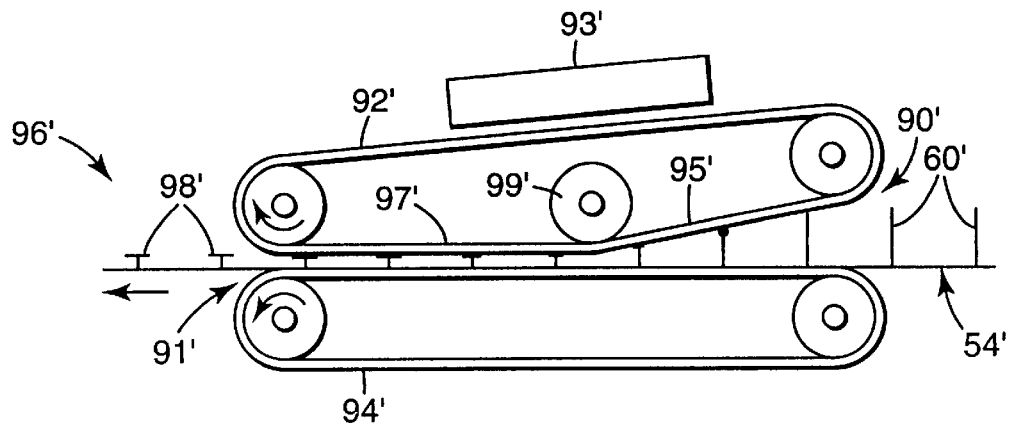
FIG. 5A is a schematic illustration of an alternate method and apparatus for forming headed stem fasteners.

FIG. 5A is an alternate embodiment of the embodiment shown in FIG. 5. Variable nip 90' is formed between a pair of opposing belts 92', 94'. Heat source 93' maintains belt 92' at the desired temperature. The heated belt 92' is angled with respect to the belt 94' to form a continuously decreasing variable nip 90' along a first tapered zone 95'. The roller 99' alters the relative angle of the belts 92', 94' along a second tapered zone 97'. The variable nip along the second tapered zone 97' may be constant, increasing or decreasing. The precursor web 54' is fed into the variable nip 90', where the stems 60' are compressively engaged along the first tapered zone 95' to form a headed stem fastener 96' with a plurality of heads 98'. In one embodiment, the gap at the nip outlet 91' is slightly greater than the gap proximate the roller 99'. It will be understood that additional rollers similar to 99' can be used to create a multiplicity of tapered zones or a variety of other shapes.

Figure 5B:
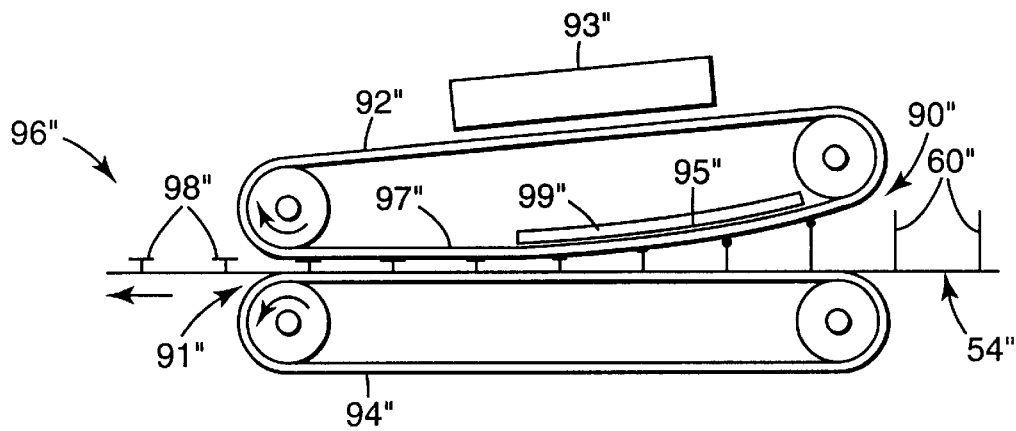
FIG. 5B is a schematic illustration of a second alternate method and apparatus for forming headed stem fasteners.

FIG. 5B is a second alternate embodiment of the embodiment shown in FIG. 5A with corresponding reference numerals. A curvilinear slide plate 99" with an upward convex shape is located behind the belt 92" in place of the roller 99' of FIG. 5A. Since the slide plate 99" can assume virtually any shape, an infinite number of nip profiles can be generated, such as illustrated in FIG. 9. For example, the slide plate 99" may assume a downward convex shape. Additionally, the nip profile can be altered by substituting a slide plate 99" with a different shape. Suitable lubrication, such as a fluid bearing, is preferably provided between the slide plate 99" and the back side of the belt 92". The opposing belts of FIGS. 5, 5A or 5B may be configured to define one or more tapered zones for achieving the desired balance between the melt front and the compression front.

Figure 6:
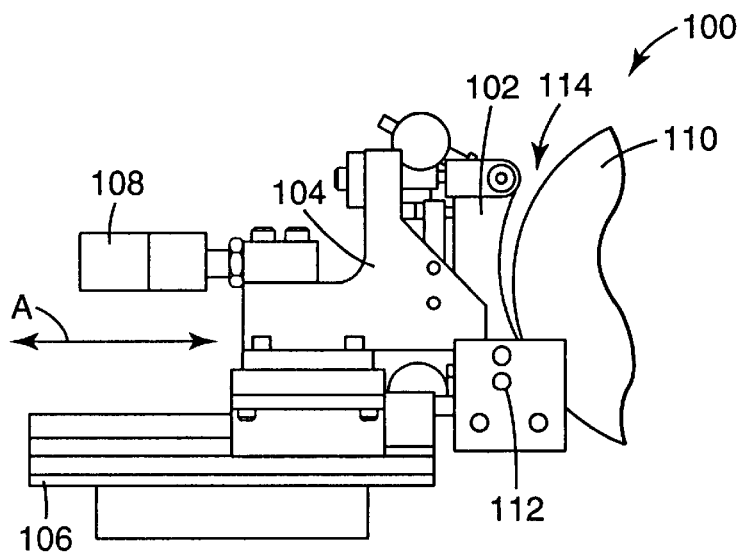
FIG. 6 is a side view of an apparatus for performing the method of the present invention.
Figure 7:
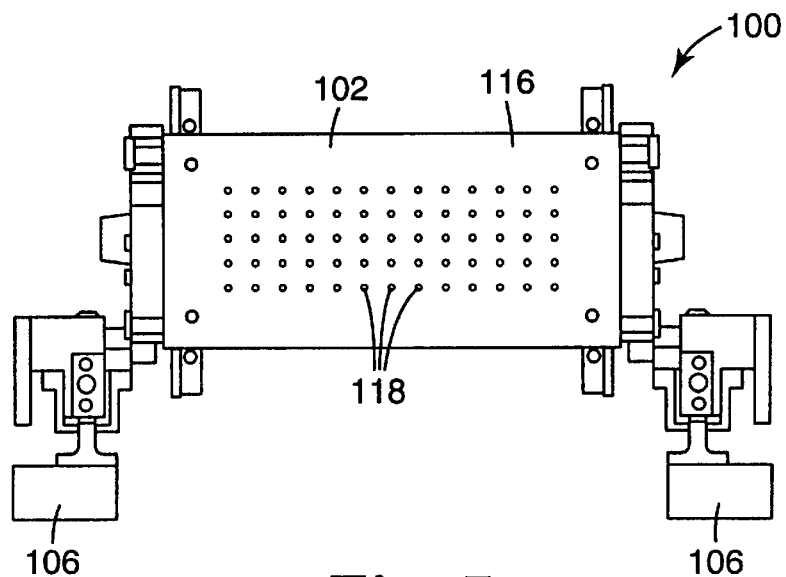
FIG. 7 is a front view of the apparatus of FIG. 6.

FIGS. 6 and 7 illustrate an exemplary embodiment of an apparatus 100 for performing the method of FIG. 4. A curved support structure 102 is mounted to a capping assembly 104. The capping assembly 104 moves on a slide 106 along an axis A. Piston 108 provides the driving force for maintaining a precursor web in compressive engagement with the heated roll 110. Capping assembly 104 may also rotate around pivot point 112 to further adjust the configuration of variable nip 114. As best seen in FIG. 7, surface 116 of the curved support structure 102 includes a plurality of holes 118. Compressed air is supplied to a plenum (not shown) behind the holes 118 so that an air bearing is formed between the rear surface of the backing and the support structure 102. The rate of air flow to the fluid bearing is dependent upon the thickness of the backing 54, the line speed, the length of the stems 60 in relation to the variable nips 64, 90, 114 and a variety of other factors.

In one embodiment of the present method shown in FIG. 4, a precursor web 54 is fed through the variable nip 64 so that the polymeric stems 60 are compressively engaged with a portion of the heated roll 66. The curved support structure 68 supports the rear surface 58 of the backing 56. In the preferred embodiment, the heated roll 66 rotates at some rate generally corresponding to the line speed of the precursor web 54 through the variable nip 64.

The rate of rotation of the heated roll 66 can be greater than, less than, or equal to the rate at which the precursor web 54 is fed through the variable nip 64. The shape of the resulting heads on the headed stem fastener will be determined, at least in part, by any relative motion of the precursor web and the heated roll. Methods for varying the shape of the head on the stem are disclosed in U.S. patent application Ser. No. 08/723,632 entitled J Hook-Type Strip for a Mechanical Fastener, filed Oct. 3, 1996 (Atty. Docket No. 52802USA2A). Depending upon the processing parameters, the polymeric stems can be formed into a variety of shapes, such as mushroom-shaped heads, J-hooks and umbrella-shaped heads.

Figure 8A:
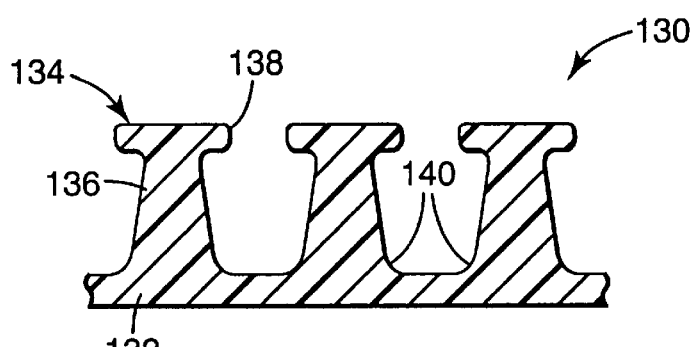
FIG. 8A is a schematic illustration of an idealized headed stem fastener formed according to the present method.

FIG. 8A is an exemplary embodiment of an idealized headed stem fastener 130 with a substantially continuous backing 132 of a thermoplastic resin. Integral with the backing is an array of "nail-head" shaped projections or hooks 134, each having a molecularly oriented stem 136, heads 138 and a fillet 140 at the base of the stem 136. The headed stem fastener of FIG. 8A can be the hook portion of a hook-and-loop fastener, or it can be releasably fastened to a fabric which is penetrable by the hooks, or it can be configured such that two pieces of the headed stem fastener 130 can be interengaged. Due to their generally flat and planar outer surfaces, the heads of the headed stem fastener are user friendly and nonabrasive to the skin, thus making them ideally suited as closures for baby diapers. The stems preferably have fillets at their bases, both to enhance strength and stiffness and for easy release from a mold in which they are formed.

Figure 8B:
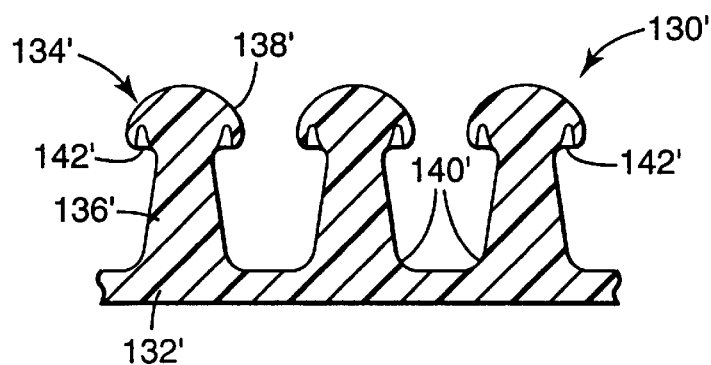
FIG. 8B is a schematic illustration of an alternate idealized headed stem fastener formed according to the present method.

FIG. 8B is a sectional view of an alternate embodiment of an idealized headed stem fastener 130' having a generally "umbrella" shaped head formed on a substantially continuous backing 132' of a thermoplastic resin. Integral with the backing is an array of "umbrella" shaped projections or hooks 134', each having a molecularly oriented stem 136', heads 138' and a fillet 140' at the base of the stem 136. An undercut 142' is formed around the stems 136' and under the heads 138'. It will be understood that actual headed stem fasteners are subject to manufacturing variability and that the idealized headed stem fasteners shown in FIGS. 8A and 8B are for illustration purposes only.

The shaped heads have a high diameter to thickness ratio. The small size and close spacing or high density of individual hooks makes it easier to firmly engage loop material in shear. Thus the headed fastener according to the present invention is particularly useful for hook-and-loop fastening when the loops are provided by conventional knit or woven fabrics or randomly woven or non-woven materials which are not particularly adapted for use as the loop portions of hook-and-loop fasteners, and which are not as well engaged by known prior art headed fasteners.

The present headed stem fastener is particularly useful on lowcost, disposable items such as diapers. For such applications, the variable nip length is generally about 11.43 cm (4.5 inches). For use on diapers, the hooks are of uniform height, preferably of from about 0.1 to 1.3 mm in height, and more preferably from about 0.2 to 0.5 mm in height. The hooks have a density on the backing preferably of from 60 to 1,600 hooks per square centimeter, and more preferably from about 125 to 700 hooks per square centimeter. The stems have a diameter adjacent the heads of the hooks preferably from 0.1 to 0.6 mm, and more preferably from about 0.1 to 0.3 mm. The heads that project radially past the stems on each side preferably by an average of about 0.01 to 0.25 mm, and more preferably by an average of about 0.025 to 0.13 mm and have average thicknesses between their outer and inner surfaces (i.e., measured in a direction parallel to the axis of the stems) preferably of from about 0.01 to 0.25 mm and more preferably of from about 0.025 mm to 0.13 mm. The heads have an average diameter (i.e., measured radially of the axis of the heads and stems) to average head thickness ratio preferably of from 1.5:1 to 12:1, and more preferably from 2.5:1 to 6:1. To have both good flexibility and strength, the backing of the headed stem fastener preferably is from 0.025 to 0.5 mm thick, and more preferably is from 0.06 to 0.25 mm in thick, especially when the fastener is made of polypropylene or a copolymer of polypropylene and polyethylene. For some uses, a stiffer backing could be used, or the backing can be coated with a layer of pressure sensitive adhesive on its surfaces opposite the hooks by which the backing could be adhered to an additional backing or a substrate so that the backing could then rely on the strength of the substrate to help anchor the hooks.

For most hook-and-loop uses, the hooks of the headed stem fastener should be distributed substantially in all directions over the entire area of the headed fastener, usually in a square, staggered or hexagonal array. For hermaphroditic uses, the hooks preferably are distributed to prevent lateral slippage when engaged. See, for example, co-assigned U.S. Pat. Nos. 3,408,705 (Kayser et al.), 4,322,875 (Brown), and 5,040,275 (Eckhardt et al.).

Headed stem fasteners made according to the present method can be inexpensive because they can be produced at higher line speeds than has been feasible for the manufacture of prior headed stem fasteners. The fastener can be produced in long, wide webs that can be wound up as rolls for convenient storage and shipment. The fastener in such rolls can have a layer of pressure sensitive adhesive on the surface of its backing opposite the hooks which can releasably adhere to the heads of the hooks on underlying wraps of the headed fastener in the roll, thus not requiring a release liner to protect the layer of pressure sensitive adhesive in the roll. The limited area of the heads to which the pressure sensitive adhesive is adhered in the roll maintains the headed fastener in the roll until it is ready for use, and then allows it to be easily unrolled from the roll. Pieces of desired lengths can be cut from a roll and adhesively or otherwise secured to articles such as a flap of a garment to permit the flap to be releasably fastened.

Virtually any orientable thermoplastic resin that is suitable for extrusion molding may be used to produce the headed fastener. Thermoplastic resins that can be extrusion molded and should be useful include polyesters such as poly(ethylene terephthalate), polyamides such as nylon, poly(styrene-acrylonitrile), poly(acrylonitrile-butadiene-styrene), polyolefins such as polypropylene, and plasticized polyvinyl chloride. A preferred thermoplastic resin is an impact copolymer of polypropylene and polyethylene containing 17.5% polyethylene and having a melt flow index of 30 that is available as SRD7-560 from Union Carbide Company of Seadrift, Tex.

EXAMPLES

135° Peel Test

A 2-inch×5 inch (5.1 cm×12.7 cm) piece of loop fastener material to be tested was securely placed on a 2-inch×5 inch (5.1×12.7 cm) steel panel by using a double-coated adhesive tape. A 1 inch×5 inch (2.5 cm×12.7 cm) piece of hook fastener material was cut and marks placed 1 inch (2.5 cm) from each end of the strip of hook fastener material. The strip of hook fastener material was then centrally placed on the loop panel so that there was a 1 inch×1 inch (2.5 cm×2.5 cm) contact area between the hooks and the loops and the leading edge of the strip of hook fastener material was along the length of the panel. The sample was rolled by hand, once in each direction, using a 4.5 pound (1000 gram) roller at a rate of approximately 12 inches (30.5 cm) per minute, to engage the complementary hook and loop fastener materials. Paper was used between the hooks and loop fastener materials to ensure a maximum 1 inch (2.5 cm) engagement. Holding the leading edge of the strip of hook material the sample was sheared slightly by hand approximately ⅛ inch (0.32 cm), engaging the hooks into the loops. The sample was then placed in a 135° peel jig. The jig was placed into the bottom jaw of an INSTRON™ Model 1122 tensile tester. Without pre-peeling the sample, the leading edge was placed in the upper jaw with the 1 inch mark at the bottom edge of the jaw. At a crosshead speed of 12 inches (30.5 cm) per minute, a chart recorder set at a chart speed of 20 inches (50.8 cm) per minute was used to record the peel which was maintained at 135°. An average of the four highest peaks was recorded in grams. The force required to remove the hook strip from the loop material was reported in grams/centimeter-width. Reported values are an average of at least five tests.

Example 1

Figure 10:
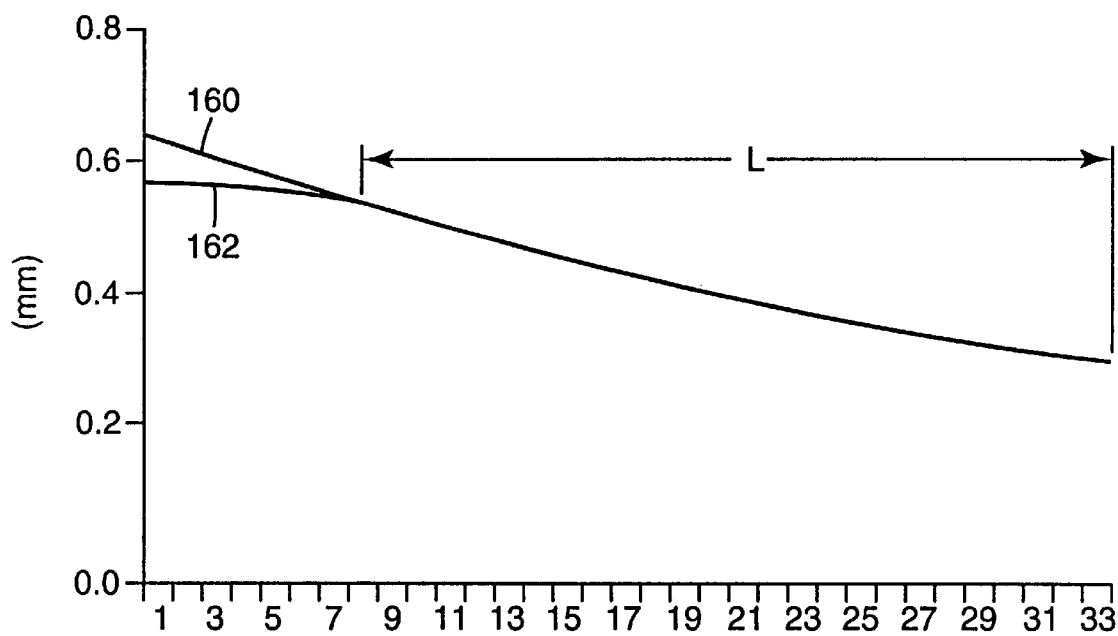
FIG. 10 is a graphic illustration of an exemplary nip gap and stem height along the variable nip length.

A computer model was created to graphically display the continually decreasing variable nip shown in FIG. 10 generated using the capping apparatus shown generally in FIGS. 6 and 7. By adjusting the inlet and outlet gaps of the apparatus, the average slope and percent contact area of the decreasing variable nip can be calculated. By adjusting the average slope, percent contact area of the capping apparatus and the calender roll temperature, different cap shapes such as shown generally in FIGS. 8A and 8B can be generated.

FIG. 10 illustrates the capping apparatus gap and hook height on the vertical axis in millimeters. The horizontal axis corresponds to the total length of the capping apparatus divided into 33 equal segments. The convergence of the capping apparatus nip gap 160 and the hook height 162 occurred at segment 8. The length of the variable nip was 11.43 cm (4.5 inches). The percent contact area was defined as the area at which capping begins and ends, compared to the total available capping area. The capping area, designated L, was 75.75% of the variable nip length (segment 8 through segment 33).

A precursor web constructed of an impact copolymer of polypropylene and polyethylene available under product designation SRD7-560 from Union Carbide located in Seadrift, Tex. was formed with a backing thickness of 0.11 mm (0.0045 inches) having approximately 140 stems per centimeter squared extending 0.635 mm (0.025 inches) above the front surface of the backing. The capping apparatus shown generally in FIGS. 6 and 7 was configured with an inlet gap of 0.81 mm (0.032 inches) and an outlet gap of approximately 0.56 mm (0.022 inches). The calender roll had a radius of 101.6 mm and the capping apparatus had a radius of 102.4 mm. The variable nip was decreased generally continuously between the inlet gap and the outlet gap with an average slope was 0.132. The maximum slope was 0.139 at segment 13 and the minimum slope was 0.116 at segment 33. The roll temperature was maintained at 144° C. (291° F.). At this temperature, the calender roll had a radius of 101.7 mm (4.0 inches).

The precursor web was fed through the variable nip at a line speed of 12 meters per minute (39 feet per minute) and the nip pressure was maintained at 55.4 kg/cm (310 pounds per lineal inch). An air pressure of 1517 kPa (60 psi) was maintained on the curved support structure to achieve an adequate air bearing for the rear surface of the backing.

The computer model was used to determine the impact of changes to the nip slope, the calender roll temperature and the percent contact area of the capping apparatus on height of the headed stems, head area in the machine and cross directions and cross sectional area of the heads. Hook height was calculated to be most sensitive to the nip slope. Head area in the cross direction was calculated to be most sensitive to the percent contact area of the capping apparatus. Head area in the machine direction was calculated to be most sensitive to the nip slope. The cross sectional area of the heads was calculated to be most sensitive to the nip slope.

By changing the slope, percent contact area and roll temperature, the cap shape can be altered, such as illustrated in FIGS. 8A and 8B. If the cap shape shown generally in FIG. 8A is desired, the cap slope should be about 0.125, percent contact area 75% and calender roll temperature 144° C. (291° F.). If the cap shape shown generally in FIG. 8B is desired, the cap slope should be about 0.093, percent contact area 90% and calender roll temperature 146° C. (294.8° F.).

Example 2

A precursor web constructed of an impact copolymer of polypropylene and polyethylene available under product designation SRD7-463 from Union Carbide located in Seadrift, Tex. was formed with a backing thickness of 0.11 mm (0.0045 inches) having approximately 140 stems per centimeter squared extending 0.635 mm (0.025 inches) above the front surface of the backing. A capping apparatus shown generally in FIGS. 6 and 7 was configured with an inlet gap of 0.46 mm (0.018 inches) and an outlet gap of approximately 0.254 mm (0.010 inches). The variable nip was decreased continuously between the inlet gap and the outlet gap. The length of the variable nip was 10.2 cm (4.0 inches) and the stems contacted 100% of the variable nip. The roll temperature was maintained at 160° C. (320° F.). The precursor web was fed through the variable nip at a line speed of 45.7 meters per minute (150 feet per minute) at an unwind tension of 344.7 kPa (50 psi). A piston on the capping apparatus was maintained at 483 kPa (70 psi). An air pressure of 414 kPa (60 psi) was maintained on the curved support structure to achieve an adequate air bearing for the rear surface of the backing.

The resulting hooks had an average height of 0.46 mm (0.018 inches) with a cross direction (CD) cap diameter of 0.41 mm (0.016 inches) and a machine direction (MD) cap diameter of 0.41 mm (0.016 inches). The peel strength of the resulting headed stem fastener was tested against a loop portion of a hook-and-loop fastener designed by Product No. KN-0560 available from Minnesota Mining & Manufacturing of St. Paul, Minn. The maximum peel force at an angle of 135° was determined to be 145.3 grams per centimeter (369 grams per inch).

Example 3

A precursor web constructed of an impact copolymer of polypropylene and polyethylene available under product designation SRD7-463 from Union Carbide located in Seadrift, Tex. was formed with a backing thickness of 0.109 mm with approximately 140 stems per square centimeter. The stems extended 0.640 mm above the front surface of the backing. A capping apparatus as generally illustrated in FIGS. 6 and 7 was configured with a nip inlet of 0.81 mm (0.032 inches) and a nip outlet of 0.48 mm (0.019 inches). The variable nip decreased continuously between the nip inlet and the nip outlet. The variable nip length was 11.43 cm (4.5 inches) and the stems contacted 82% of the variable nip. The roll temperature was maintained at 144° C. (291° F.). The precursor web was fed through the variable nip at a line speed of 12 meters per minute with a web tension of 200 N. A piston on the capping apparatus was maintained at 1517 kPa and an air pressure of 414 kPa was maintained on the curved support structure to achieve an adequate air bearing for the rear surface of the backing. The resulting hooks had an average height of 0.45 mm with a CD cap diameter of 0.44 mm and a MD cap diameter of 0.43 mm.

Patents and patent applications disclosed herein are hereby incorporated by reference. The present invention has now been described with reference to several embodiments described herein. It will be apparent to those skilled in the art that many changes can be made in the embodiments without departing from the scope of the invention. Thus, the scope of the present invention should not be limited to the structures described herein, but only to structures described by the language of the claims and the equivalents to those structures.

What is claimed is:

1. A method of capping a stem to form a headed stem fastener comprising the steps of:
   providing a precursor web comprising a backing with a rear surface, a front surface, and a multiplicity of polymeric stems projecting distally from the front surface of the backing;
   positioning a heated member opposite a support surface to form a variable nip having a variable nip length, the support surface having a shape generally conforming to a contour of the heated member; and
   feeding the precursor web through the variable nip to compressively engage the polymeric stems between the heated member and the support surface along a portion of the variable nip length so that distal ends of the polymeric stems are compressed axially downward into a hook head shape having an axial diameter to thickness ratio of from 1.5:1 to 12:1.

2. The method of claim 1 wherein the step of positioning comprises forming a nip gap that decreases along the variable nip length.

3. The method of claim 1 wherein the step of positioning comprises forming a nip gap having a generally constant rate of decrease along the variable nip length.

4. The method of claim 1 wherein the step of positioning comprises forming a nip gap that decreases more rapidly near a nip inlet than near a nip outlet.

5. The method of claim 1 wherein the step of positioning comprises forming a nip gap that decreases more rapidly near a nip outlet than near a nip inlet.

6. The method of claim 1 wherein the step of positioning comprises forming a nip gap having a generally constant rate of decrease near a nip inlet and a nip gap having a nonuniform rate of increase near a nip outlet.

7. The method of claim 1 wherein the step of positioning comprises forming a nip gap that remains constant along a portion of the variable nip length.

8. The method of claim 1 wherein the step of positioning a heated member comprises positioning a heated roll opposite a curved support surface.

9. The method of claim 8 wherein the curved support surface comprises a radius of curvature generally corresponding to a radius of curvature of the heated roll.

10. The method of claim 8 wherein the curved support structure defines a variable nip length comprising at least 1.25 times greater than a nip length defined by two rolls having an equivalent diameter as the heated roll.

11. The method of claim 8 wherein the curved support structure defines a variable nip length comprising at least 1.5 times greater than a nip length defined by two rolls having an equivalent diameter as the heated roll.

12. The method of claim 8 wherein the curved support structure defines a variable nip length comprising at least 3.0 times greater than a nip length defined by two rolls having an equivalent diameter as the heated roll.

13. The method of claim 1 wherein the step of positioning a heated member comprises the step of positioning a heated belt opposite the support surface.

14. The method of claim 13 further comprising the step of locating means for altering a shape of the heated belt along a back surface thereof.

15. The method of claim 14 wherein the means for altering comprises a curvilinear slide plate.

16. The method of claim 13 wherein the support surface comprises an opposing support belt.

17. The method of claim 13 wherein the heated belt and the support surface define at least two tapered zones.

18. The method of claim 13 wherein the heated belt comprises a generally planar configuration.

19. The method of claim 1 further comprising moving the heated member at a rate generally corresponding to a line speed of the precursor web through the variable nip.

20. The method of claim 1 further comprising moving the heated member at a rate greater than a line speed of the precursor web through the variable nip.

21. The method of claim 1 further comprising moving the heated member at a rate less than a line speed of the precursor web through the variable nip.

22. The method of claim 1 further comprising generating a low friction interface between the rear surface of the backing and the support surface.

23. The method of claim 22 wherein generating a low friction surface comprises supplying compressed air to a plurality of holes in the support surface.

24. The method of claim 22 wherein generating a low friction surface comprises providing a low surface energy material on at least a portion of the support surface.

25. The method of claim 1 wherein the step of positioning the heated member opposite the support surface comprises rotating the support surface into engagement with the heated member.

26. The method of claim 1 wherein the step of deforming the distal ends of the polymeric stems comprises forming mushroom-shaped heads on the distal ends.

27. The method of claim 1 wherein deforming the distal ends of the polymeric stems comprises the step of forming J-shaped hook portions on the distal ends.

28. The method of claim 1 wherein the backing comprises a polymeric film.

* * * * *

UNITED STATES PATENT AND TRADEMARK OFFICE
CERTIFICATE OF CORRECTION

PATENT NO. : 6,039,911
DATED : March 21, 2000
INVENTOR(S) : Philip Miller and Thomas R. LaLiberte It is certified that error appears in the above-identified patent and that said Letters Patent is hereby corrected as shown below:

Column 1,
Line 6, please delete "apparatusfor" and insert -- apparatus for --.

Column 5,
Line 65, please delete "thought" and insert -- through --.

Column 8,
Line 21, please delete "in" before the phrase "thick, especially when".

Column 10,
Line 4, after the word "slope" and before "0.132.", please delete "was".

Signed and Sealed this

Twenty-sixth Day of November, 2002

*Attest:*

*Attesting Officer*

JAMES E. ROGAN
*Director of the United States Patent and Trademark Office*